US008589882B2

(12) United States Patent
Shochat et al.

(10) Patent No.: US 8,589,882 B2
(45) Date of Patent: Nov. 19, 2013

(54) ANALYZING COMPUTER CODE DEVELOPMENT ACTIONS AND PROCESS

(75) Inventors: Moran Shochat, Zichron Ya'akov (IL); Itzhack Goldberg, Hadera (IL); Aviad Zlotnick, Mitzpe Netofah (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/820,149

(22) Filed: Jun. 22, 2010

(65) Prior Publication Data
US 2011/0314450 A1 Dec. 22, 2011

(51) Int. Cl.
*G06F 9/44* (2006.01)

(52) U.S. Cl.
USPC .......................................... 717/124; 717/100

(58) Field of Classification Search
None
See application file for complete search history.

(56) References Cited

U.S. PATENT DOCUMENTS

| | | | |
|---|---|---|---|
| 6,513,154 B1 | 1/2003 | Porterfield | |
| 6,698,013 B1* | 2/2004 | Bertero et al. | 717/127 |
| 7,562,344 B1* | 7/2009 | Allen et al. | 717/113 |
| 7,617,415 B1* | 11/2009 | Kadakia | 714/26 |
| 2005/0015675 A1* | 1/2005 | Kolawa et al. | 714/38 |
| 2005/0223354 A1* | 10/2005 | Drissi et al. | 717/114 |
| 2006/0156286 A1* | 7/2006 | Morgan et al. | 717/124 |
| 2007/0006161 A1* | 1/2007 | Kuester et al. | 717/126 |
| 2007/0016544 A1* | 1/2007 | Graefe et al. | 707/1 |
| 2008/0263507 A1* | 10/2008 | Chang et al. | 717/104 |
| 2009/0070734 A1* | 3/2009 | Dixon et al. | 717/102 |
| 2011/0041120 A1* | 2/2011 | Nagappan et al. | 717/126 |

FOREIGN PATENT DOCUMENTS

JP 62117042 5/1987

OTHER PUBLICATIONS

McKeogh et al. "Eclipse Plug-in to Monitor the Programmer Behavior", 2004, OOPSLA'04 Eclipse Technology eXchange (EXT) Workshop.*
Arisholm et al. "Predicting Fault-Prone Components in a Java Legacy System", 2006, ISESE'06.*
Weyuker et al. "Using Developer Information as a Factor for Fault Prediction", 2007, Third International Workshop on Predictor Models in Software Engineering (PROMISE'07).*
Takada et al. "A Programmer Performance Measure Based on Programmer State Transitions in Testing and Debugging Process", 1994, IEEE.*

(Continued)

*Primary Examiner* — Chat Do
*Assistant Examiner* — Jue Wang

(57) ABSTRACT

A method that may include: monitoring over time, actions carried out by at least one programmer over a software development environment to yield development patterns; comparing the development patterns to best practice rules to yield a comparison results indicating deviations of the development patterns from the best practice rules; and analyzing the comparison results based at least partially on a likelihood of each action deviated from the respective best practice rule to result in a software bug, to yield an analysis of potential software bug prone code sections, wherein at least one of the monitoring, the comparing, and the analyzing is executed by at least one processor.

15 Claims, 3 Drawing Sheets

(56) References Cited

OTHER PUBLICATIONS

Zou et al. "Detecting Interaction Coupling from Task Interaction Histories", 2007, 15th IEEE International Conference on Program Comprehension.*

Nagapan et al. "Influence of Organizational Structure on Software Quality: An Empirical Case Study", May 2008, ICSE'08.*

Meneely et al. "Predicting Failures with Developer Networks and Social Network Analysis" 2008, SIGSOFT 2008.*

Murphy et al. "Retina: Helping Students and Instructors Based on Observed Programming Activities", Mar. 2009, SIGCSE'09.*

Abreu et al. "How Developer Communication Frequency Relates to Bug Introducing Changes", Aug. 2009, IWPSE-Evol'09.*

Carter et al. Are You Having Difficulty?, Feb. 2010, CSCW 2010.*

* cited by examiner

ANALYZING COMPUTER CODE DEVELOPMENT ACTIONS AND PROCESS

BACKGROUND

1. Technical Field

The present invention relates to the process of computer code development and more particularly, to providing feedback and recommendations by analyzing same.

2. Discussion of the Related Art

The life cycle of computer code development, according to some models, includes a sequence of well structured steps. The process usually begins with the requirement documents detailing in a natural language format what the customer needs. The requirements are then being transformed into design specification by a software engineer. The design specification outline in a high level forms the specifications that the computer code needs to implement in order to meet the requirements. The design specifications are then being implemented in actual computer code form by a programmer over a specified software development environment. The development environment is usually a computer aided tool that provided templates, libraries and overall support in the process of transforming the design requirements into a computer code.

After the completion of the implementation of the design specifications in computer code, the code may be checked for bugs that have been generated during the implementation of the design specifications. Bugs are detected, for example, by formal and functional testing. Many approaches and techniques for detecting these bugs and improving the overall quality of software programs have been developed throughout the years. Some of these techniques may include: code review, static analysis, unit testing, system testing, and coverage analysis.

However, all of these techniques are executed post factum, after some or all of the computer code has been authored by the programmers. Specifically, none of the aforementioned techniques analyzes the software development actions performed by the programmer over his or her development environment.

BRIEF SUMMARY

One aspect of the invention provides a method that may include the following steps: the step of monitoring over time actions carried out by at least one programmer over a software development environment to yield development patterns; the step of comparing the development patterns to best practice rules, to yield comparison results indicating deviations of the development patterns from the best practice rules; and the step of analyzing the comparison results based at least partially on a likelihood of each action deviated from the respective best practice rule to result in a software bug, to yield an analysis of potential software bug prone code sections, wherein at least one of the aforementioned steps is executed by at least one processor.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
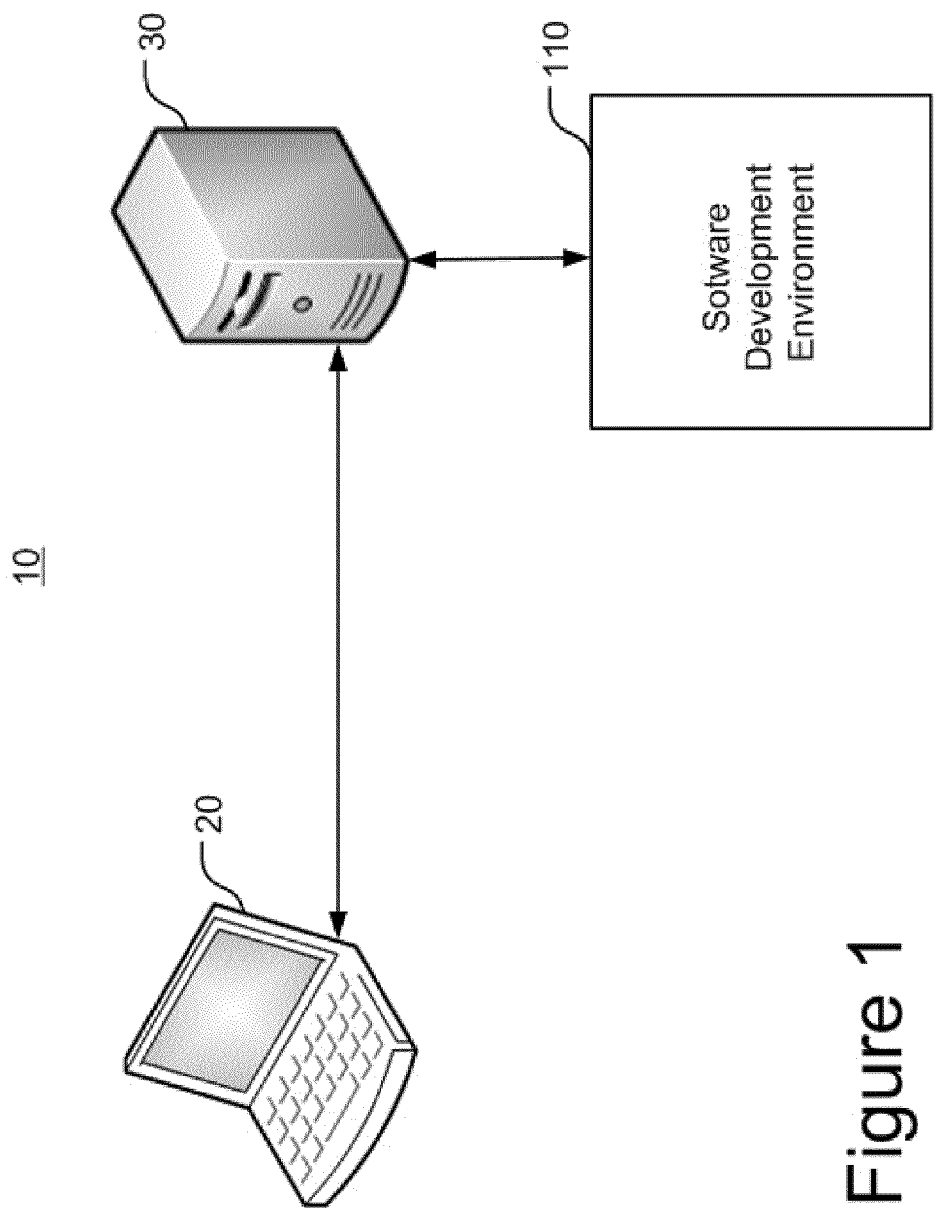
FIG. 1 is a high level schematic block diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "software development environment" as used herein in this application refers to the entire environment (applications, servers, network) that provides comprehensive facilities to computer programmers for software development. Software development environment may include but is not limited to: requirements management tools, design modeling tools, documentation generation tools, integrated development environment (IDE), code Analysis tools, code referencing tools, code inspection tools, software building tools (compile, link), source repository (configuration management), and problem reporting/tracking tools.

The term "software bug" as used herein in this application is the common term used to describe an artifact, error, flaw, mistake, failure, or fault in a computer program or system that produces an incorrect or unexpected result, or causes it to behave in unintended ways. Most bugs arise from mistakes and errors made by people in either a program's source code or its design, and a few are caused by compilers producing incorrect code.

The term "best practice" as used herein in this application refers to a technique, method, process, activity, incentive, or reward that is believed to be more effective at delivering a particular outcome than any other technique, method, or process, when applied to a particular condition or circumstance. Best practices can also be defined as the most efficient (least amount of effort) and effective (best results) way of accomplishing a task, based on repeatable procedures that have proven themselves over time for large numbers of people.

The term "best coding practices" as used herein in this application refers to best practices for software development. These may be broken into many levels based on the coding language, the platform, the target environment and so forth. Using best practices for a given situation greatly reduces the probability of introducing errors into a computer application, regardless of which software development model is being used to create that application.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary environment of a system according to some embodiments of the invention. According to the exemplary embodiment, computer network 10 may include a personal computer 20 connected to a server 30. It is understood however, that any type of computer may be used instead of server 30. Server 30 may in operative association with a software development environment 110.

In operation, data derived from software development environment 110 and pertaining to the actions carried by the programmer are analyzed in order to detect potential problems throughout the development process. The monitored actions may be compared to best practice rules so that some feedback regarding the likelihood of potential problems caused by some of the actions may be presented to the programmer. The monitored actions may include, for example: code editing actions, file actions, running actions, debugging actions, and testing actions, and the like. Code sections that may be affected by these actions may be indicated for closer inspection.

Advantageously, the aforementioned feature of monitoring the development process on the fly, takes into account the process of creating or changing the code and not only the final saved result. Thus, some of the potential bugs may be avoided. In addition, pre conditions that may lead to potential bugs may be also detected so that further bugs in future steps may also be avoided.

Figure 2:
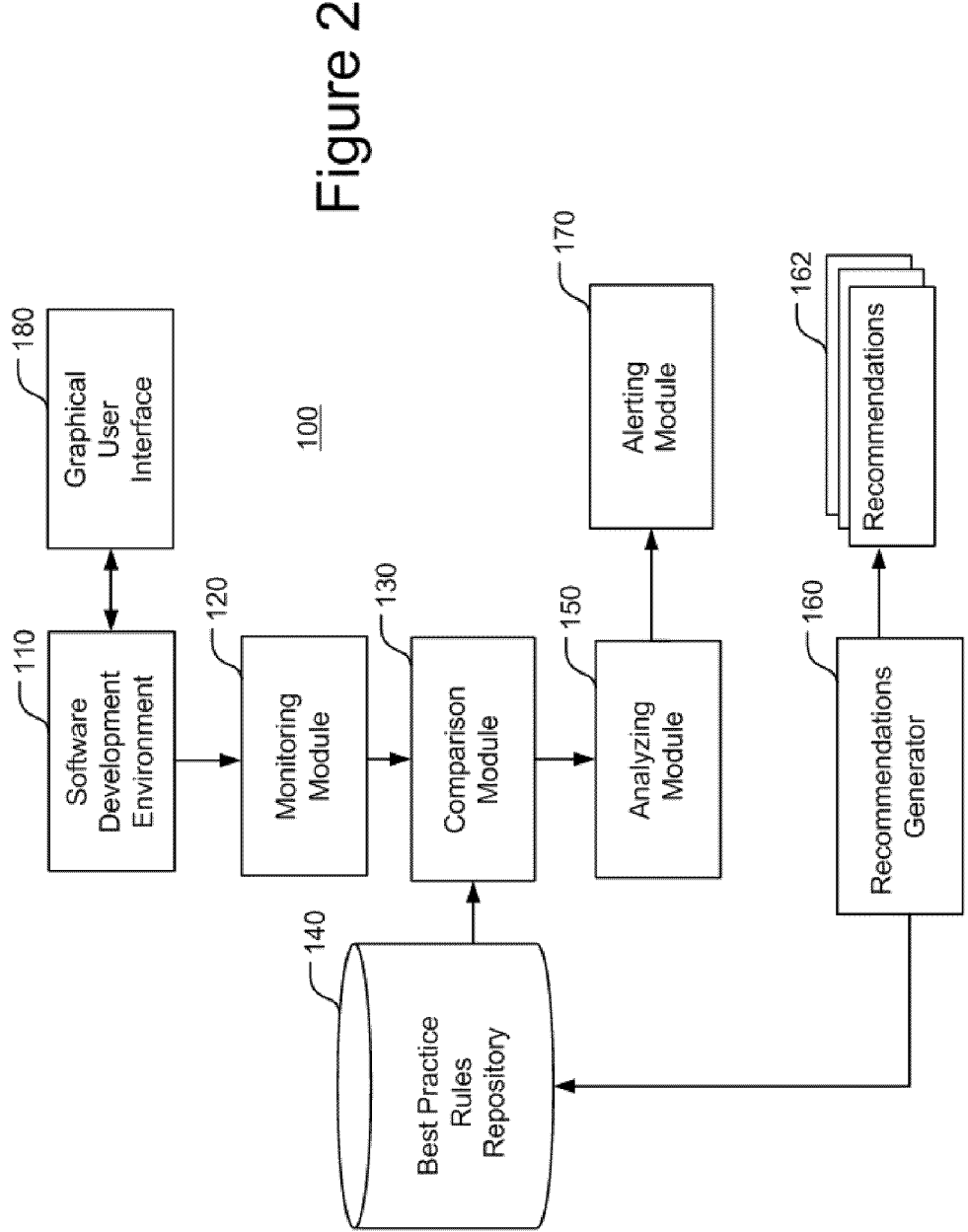
FIG. 2 is a high level schematic block diagram illustrating a system according to some embodiments of the invention.

FIG. 2 is a high level schematic block diagram illustrating system 100 according to some embodiments of the invention. System 100 may include a software development environment 110 in operative association with a monitoring module 120. System 100 may further include a best practice repository 140 that includes a plurality of rules that are extracted from guidelines for reducing, inter alia, the amount of software bugs in the respective software development environment 110. System 100 may further include a comparison module 130 and an analyzing module 150 in operative association with comparison module 130. Comparison module 13 is in operative association with both monitoring module 120 and best practice repository 140.

In operation, monitoring module 120 is configured to monitor the actions carried out by at least one programmer over software development environment 110. These actions may include, for example: edit actions such as copy, cut, and paste; file actions such as open, close, copy, paste, and compare; version control actions such as file commit; and action relating to usage (or lack thereof) of development tools such as debugger and coverage collection.

Monitoring module 120 operates on-the-fly during the actual process and activities carried out by the programmer. The accumulated monitored actions are then being compared by comparison module 130 with best practice rules extracted from best practice repository 140 to yield a comparison indicating the deviation of the development process from the best practice rules. The comparison may further indicate a tracking of the programmer's activities to their effect on the computer code in view of the best practice rules. The comparison is then analyzed by analyzing module 150 by applying at least one decision function that may take into account specified warning thresholds as well as the likelihood of the deviation from the best practice to become a potential software bug.

The following are non limiting examples of software bug patterns and problems that may be detected by system 100. Copy-paste bug: this bug is caused by copying a code portion without re-editing and amending it into its new location. It also refers to copying an erroneous code portion to other location in the code. By analyzing the edit actions in software development environment 110, copy-paste portion may be easily detected and presented in view of specific programmer's actions. High editing activity is also a well known indication of software bugs. Statistically, having many changes in the code is related to having a higher risk of bugs in this code. Analyzing the edit actions carried out over software development environment 110 will make it easy to find code segments with high editing activity in a relatively short period of time. It should be noted that these highly edited segments are bug-prone even if the final code is not much different from the original code. Optionally, the programmer may receive a quantitative indicator for the amount of editing that has been applied to a specified portion of code.

Other monitored actions may include outdated documentation. Outdated documentation may lead to code misunderstanding by other programmer on the team which may cause further problems throughout the software development lifecycle. By analyzing the edit and file history carried out by the programmers over software development environment 110, situations in which the documentation has been written a long time after writing the code or when changing the code without updating the documentation may be indicated to the programmer.

Yet other monitored actions may include code changes following unit tests. In unit testing, small portions of the code are tested individually. Making many changes in the code following unit testing is a known indication for potential problems. By analyzing the edit actions carried out by the programmer shortly after unit testing, potential bugs due to code changes following unit testing may be detected.

Optionally, system 100 may further include an alerting module 170 coupled to analyzing module 150. Alerting module 170 may be configured to alert the programmer to detected software bug-prone actions based on a specified scoring of the likelihood each action deviated from the respective best practice rule to result in a software bug. These alerts may be textual and may detail the specific bug-prone action and the specific portion of the affected code.

Optionally, analyzing module 150 may be further configured to base at least part of the analysis on a profile of the programmer indicating historic development patterns. This profile may contain data relating to the role of the programmer, his or her skills and knowledge. Additionally, analyzing module 150 may be further configured to base at least part of the analysis on external actions of the programmer, i.e., actions not related to the actions that are carried out over the software development environment. These external actions may be actions that took place in the working environment of the programmer or outside it, that are not related directly to his or her role as a programmer but affect his or her skills, or indicate lower concentration on the programming task. For example, switching of windows in a frequency above a specified level, while editing code may be also indicative of a higher risk of errors in that code.

In case of a plurality of programmers working together on a common software development environment, it may be possible to deduce information regarding bug-prone code sections authored by one programmer, using an analysis of the code sections authored by the other programmers. Specifically, monitoring module 120 may be further configured to monitor actions carried out by two or more programmers over a common software development environment. In addition, analyzing module 150 may be further configured to use the correlation between the actions of the programmers to detect potential software bug-prone code sections authored by one programmer, based on the analysis of the potential software bug-prone code sections authored by other programmers.

Optionally, system 100 may further include recommendations generator 160 configured to generate recommendations 162 based on the analysis. These recommendations may be in a natural language form and address the specific programmer or generalized recommendations. In addition, at least some of the recommendations may be transformed into best practice rules and may be fed back by recommendations generator 160 into best practice repository 130.

Optionally, system 100 may further include a graphical user interface configured to visually indicate code portions vis à vis respective representation of potential software bug prone actions. The programmer, for example may be pointed to the sections he or she have re-edited with the potential bugs highlighted.

Figure 3:
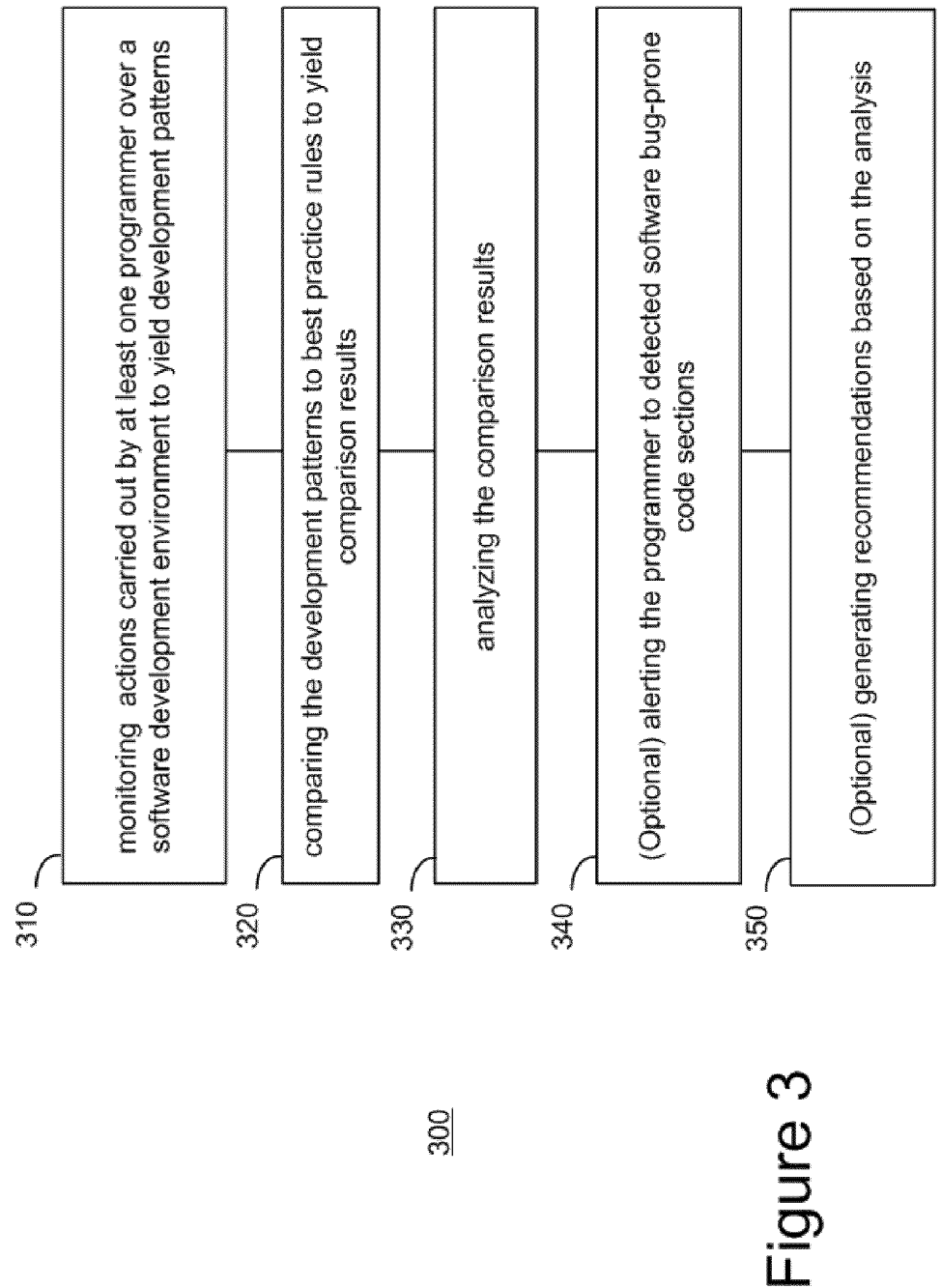
FIG. 3 is a high level flowchart diagram illustrating a method according to some embodiments of the invention.

FIG. 3 is a high level flowchart diagram illustrating a method 300 according to some embodiments of the invention. The method may start with monitoring over time, actions carried out by at least one programmer over a software development environment to yield development patterns 310. After the monitored actions are accumulated into development patterns, method 300 may go on to compare the development patterns to best practice rules to yield comparison results indicating deviations of the development patterns from the best practice rules 320. Method 300 then proceeds to analyzing the comparison results 330 based at least partially on a likelihood of each action deviated from the respective best practice rule to result in a software bug, to yield an analysis of potential software bug prone code sections. The analysis may be for example in a probability table form indicating which sections of the code are likely to have bugs in it (and optionally, at which probability).

In order to implement method 300, a computer may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

Optionally, method 300 may further include the step of alerting the programmer to detected software bug-prone actions based on a specified scoring of the likelihood each action deviated from the respective best practice rule to result in a software bug 340.

Optionally, the step analyzing 330 is further based on a profile of the programmer indicating historic development patterns. In addition, the analysis may be further based on external actions of the programmer being actions not related to the actions that are carried out over the software development environment. In software development environment supporting a plurality of programmers, analyzing step 330 may be further based on at least two monitored patterns of at least two programmers respectively, each programmer carrying out actions over a common software development environment such that the analysis further indicates a level of cooperation between the at last two programmers over the common software development environment.

Optionally, method 300 may further include the step of generating recommendations based on the analysis. These recommendations may be supplied to the programmers, other software engineers or alternatively, fed back into a best practice repository for updating wherein best practice rules 350.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   monitoring actions carried out by at least one human operator using an editor to edit program code in a software development environment, wherein the monitoring of the actions performed by the human operator are analyzed to yield development patterns associated with the human operator's skills in writing program code;
   comparing, using one or more processors, the development patterns associated with the human operator to best practice rules to yield comparison results indicating deviations of the development patterns from the best practice rules, wherein the development patterns are established based on factors related to timing and level of activity associated with the human operator editing one or more segments of the program code or whether the human operator's editing activities associated with editing a segment of the program code was preceded or followed by a predetermined activity;
   analyzing, using one or more processors, the comparison results based at least partially on a likelihood of each action deviating from the respective best practice rule to result in a software bug, to yield an analysis of potential software bug-prone code sections;
   alerting the human operator to detected software bug-prone code section based on a specified scoring of the likelihood of each action that deviated from the respective best practice rule to result in a software bug, and
   generating recommendations based on the analysis, wherein the recommendations are used to update the best practice rules.

2. The method according to claim 1, wherein the analyzing is further based on a profile of the human operator indicating historic development patterns.

3. The method according to claim 1, wherein the analyzing is further based on external actions of the human operator being actions not related to the actions that are carried out over the software development environment.

4. The method according to claim 1, wherein the monitoring is of actions carried out by two or more human operators over a common software development environment, and wherein correlation between the actions of the human operators is used to detect potential software bug-prone code sections authored by one human operator, based on the analysis of the potential software bug-prone code sections authored by other human operators.

5. The method according to claim 1, further comprising visually indicating code portions vis à vis respective representation of potential software bug prone code sections.

6. A system comprising:
   one or more processors;
   a monitoring module for monitoring actions carried out by at least one human operator using an editor to edit program code in a software development environment, wherein the monitoring of the actions performed by the human operator are analyzed to yield development patterns associated with the human operator's skills in writing program code;
   a comparing module for comparing the development patterns associated with the human operator to best practice rules to yield comparison results indicating deviations of the development patterns from the best practice rules, wherein the development patterns are established based on factors related to timing and level of activity associated with the human operator editing one or more segments of the program code or whether the human operator's editing activities associated with editing a segment of the program code was preceded or followed by a predetermined activity;
   an analyzing module configured to analyze the comparison results based at least partially on a likelihood of each action deviating from the respective best practice rule to result in a software bug, to yield an analysis of potential software bug-prone actions;
   an alerting module for alerting the human operator to detected software bug-prone code section based on a specified scoring of the likelihood of each action that deviated from the respective best practice rule to result in a software bug, and
   a recommendations generator for generating recommendations based on the analysis, wherein the recommendations are used to update the best practice rules.

7. The system according to claim 6, wherein the analyzing module is further configured to base at least part of the analysis on a profile of the human operator indicating historic development patterns.

8. The system according to claim 6, wherein the analyzing module is further configured to base at least part of the analysis on external actions of the human operator being actions not related to the actions that are carried out over the software development environment.

9. The system according to claim 6, wherein the monitoring module is further configured to monitor actions carried out by two or more human operators over a common software development environment, and wherein the analyzing module is further configured to use correlation between the actions of the human operators to detect potential software bug-prone code sections authored by one human operator, based on the analysis of the potential software bug-prone code sections authored by other human operators.

10. The system according to claim 6, further comprising a graphical user interface configured to visually indicate code portions vis à vis respective representation of potential software bug prone actions.

11. A computer program product comprising logic code embedded in a non-transitory data storage medium, wherein execution of the logic code on a computer causes the computer to:
    monitor actions carried out by at least one human operator programmer using an editor to edit program code in a software development environment, wherein the monitoring of the actions performed by the human operator are analyzed to yield development patterns associated with the human operator's skills in writing program code;
    compare the development patterns associated with the human operator to best practice rules to yield comparison results indicating deviations of the development patterns from the best practice rules, wherein development patterns are established based on factors related to timing and level of activity associated with the human operator editing a segment of the program code or whether the human operator's editing activities associated with editing a segment of the program code was preceded or followed by a predetermined activity;

analyze the comparison results based at least partially on a likelihood of each action deviated from the respective best practice rule to result in a software bug, to yield an analysis of potential software bug-prone actions;

alert the human operator to detected software bug-prone code section based on a specified scoring of the likelihood of each action that deviated from the respective best practice rule to result in a software bug, and generate recommendations based on the analysis, wherein the recommendations are used to update the best practice rules.

12. The computer program product according to claim 11, wherein at least part of the analysis is based on a profile of the human operator indicating historic development patterns.

13. The computer program product according to claim 11, wherein at least part of the analysis is based on external actions of the human operator being actions not related to the actions that are carried out over the software development environment.

14. The computer program product according to claim 11, wherein actions carried out by two or more human operators over a common software development environment are monitored, and wherein correlation between the actions of the human operators is used to detect potential software bug-prone code sections authored by one human operator, based on the analysis of the potential software bug-prone code sections authored by other human operators.

15. The computer program product according to claim 11, wherein code portions may be visually indicated vis à vis respective representation of potential software bug prone actions.

* * * * *